(12) United States Patent
Motoyama (10) Patent No.: US 11,268,431 B2
(45) Date of Patent: Mar. 8, 2022

(54) EXHAUST GAS PURIFICATION DEVICE

(71) Applicant: KABUSHIKI KAISHA TOYOTA JIDOSHOKKI, Kariya (JP)

(72) Inventor: Yuto Motoyama, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 76 days.

(21) Appl. No.: 16/766,056

(22) PCT Filed: Nov. 29, 2018

(86) PCT No.: PCT/JP2018/043888
§ 371 (c)(1),
(2) Date: May 21, 2020

(87) PCT Pub. No.: WO2019/124016
PCT Pub. Date: Jun. 27, 2019

(65) Prior Publication Data
US 2020/0347762 A1 Nov. 5, 2020

(30) Foreign Application Priority Data
Dec. 19, 2017 (JP) .............................. JP2017-242706

(51) Int. Cl.
*F01N 3/02* (2006.01)
*F01N 3/28* (2006.01)
(Continued)

(52) U.S. Cl.
CPC ............ *F01N 13/18* (2013.01); *F01N 3/0211* (2013.01); *F01N 3/035* (2013.01); *F01N 3/28* (2013.01);
(Continued)

(58) Field of Classification Search
CPC .......... F01N 3/0211; F01N 3/28; F01N 13/18; F01N 13/1805; F01N 13/1827;
(Continued)

(56) References Cited

U.S. PATENT DOCUMENTS

2007/0257487 A1* 11/2007 Jacklich ................... F23J 13/04
285/401
2010/0269494 A1* 10/2010 Saito ................... F01N 13/0097
60/311
(Continued)

FOREIGN PATENT DOCUMENTS

CN 102124191 A 7/2011
CN 102644813 A 8/2012
(Continued)

*Primary Examiner* — Audrey B. Walter
(74) *Attorney, Agent, or Firm* — Sughrue Mion, PLLC (57) ABSTRACT

An exhaust gas purification device includes an upstream cylinder, a downstream cylinder, and a purifying cylinder. The upstream cylinder, the purifying cylinder, and the downstream cylinder each have at an end thereof a flange portion having a flat connecting surface. Each flange portion of one of the upstream and downstream flange portions of the purifying cylinder, and the flange portions of the upstream cylinder and the downstream cylinder includes an engagement pin having an engagement recess portion. Each flange portion of the other includes a pin hole and an engagement groove. The engagement recess portion is fitted into and engaged with the engagement groove.

7 Claims, 6 Drawing Sheets

(51) Int. Cl.
 F01N 3/035 (2006.01)
 F01N 13/18 (2010.01)
 F01N 3/021 (2006.01)

(52) U.S. Cl.
 CPC ..... F01N 13/1805 (2013.01); F01N 13/1827 (2013.01); F01N 13/1855 (2013.01); *F01N 2450/18* (2013.01); *F01N 2450/24* (2013.01); *F01N 2450/26* (2013.01)

(58) Field of Classification Search
 CPC ............. F01N 13/1855; F01N 2450/18; F01N 2450/24; F01N 2450/26
 See application file for complete search history.

(56) References Cited

U.S. PATENT DOCUMENTS

| | | |
|---|---|---|
| 2011/0023472 A1 | 2/2011 | Saito et al. |
| 2011/0120085 A1 | 5/2011 | Saito et al. |
| 2015/0240697 A1* | 8/2015 | Smith .................. F01D 25/285 60/598 |

FOREIGN PATENT DOCUMENTS

| | | |
|---|---|---|
| JP | 2008-95814 A | 4/2008 |
| WO | 2010/026864 A1 | 3/2010 |

* cited by examiner

EXHAUST GAS PURIFICATION DEVICE

CROSS-REFERENCE TO RELATED APPLICATIONS

This application is a National Stage of International Application No. PCT/JP2018/043888 filed Nov. 29, 2018, claiming priority based on Japanese Patent Application No. 2017-242706 filed Dec. 19, 2017, the contents of all of which are incorporated herein by reference in their entirety.

TECHNICAL FIELD

The present invention relates to an exhaust gas purification device that purifies exhaust gas discharged from an internal combustion engine.

BACKGROUND ART

An exhaust gas purification device of a diesel engine has a purifying processing member, such as a particulate matter removing filter (hereinafter, referred to as diesel particulate filter or DPF) for capturing and removing particulate matter (PM) from exhaust gas. Since the DPFs that purify exhaust gas are designed to capture PM in the exhaust gas, the DPFs require periodical cleaning to rinse and remove the PM that is captured and deposited on the DPFs. In view of this, various techniques for the exhaust gas purification device have been proposed in order to enhance the workability of cleaning the DPFs.

For example, an exhaust gas purification device described in the following Patent Document 1 includes a filter accommodating cylinder having positioning pins each disposed in front and rear side flange portions of the filter accommodating cylinder, an upstream cylinder having in a flange portion thereof a notched groove, and a downstream cylinder having in a flange portion thereof a notched groove. With this configuration, when the filter accommodating cylinder is connected between the upstream cylinder and the downstream cylinder, the front and rear positioning pins disposed in the filter accommodating cylinder are engaged with the notched grooves of the upstream cylinder and the downstream cylinder, respectively. Thus, the filter accommodating cylinder is configured to be positioned coaxially with the upstream cylinder and the downstream cylinder.

CITATION LIST

Patent Document

Patent Document 1: PCT International Publication WO2010/026864

SUMMARY OF INVENTION

Technical Problem

However, in the aforesaid exhaust gas purification device described in the Patent Document 1, the filter accommodating cylinder is mounted on or removed from the exhaust gas purification device while the upstream cylinder and the downstream cylinder are fixed to purification device supporting brackets. Specifically, after the front and rear positioning pins disposed in the filter accommodating cylinder are inserted into pin holes of gaskets, the gaskets are temporarily fixed to the front side flange portion and the rear side flange portion of the filter accommodating cylinder. In this state, the filter accommodating cylinder is inserted between the upstream cylinder and the downstream cylinder while the front and rear positioning pins disposed in the filter accommodating cylinder are engaged with the notched grooves of the upstream cylinder and the downstream cylinder, respectively.

As a result, a slight space is formed in either between the gasket in front of the filter accommodating cylinder and the flange portion of the upstream cylinder or between the gasket rearward of the filter accommodating cylinder and the flange portion of the downstream cylinder. In this state, outer circumferential portions of flange portions facing each other are fastened by annular clamping devices that each have a substantially V-shaped cross-section, and fixed while the flange portions are hermetically sealed by the gaskets.

On the contrary, while the clamping device urges interactively the flange portions facing each other inward in an axial direction thereof, the clamping device is exposed to heat of exhaust gas that passes through the upstream cylinder, the filter accommodating cylinder, and the downstream cylinder, so that creep occurs in the clamping devices. The creep decreases the urging force in which the clamping device interactively urges the flange portions facing each other inward in the axial direction thereof, deteriorating hermeticity of the sealing by the gaskets.

The present invention has been made in view of such circumstances, and it is an objective of the present invention to provide an exhaust gas purification device in which a purifying cylinder is positioned coaxially with an upstream cylinder and a downstream cylinder, and the purifying cylinder is connected to the upstream cylinder and the downstream cylinder while the connecting surfaces of the flange portions facing each other are in contact with each other.

Solution to Problem

To achieve the foregoing objective and in accordance with one aspect of the first invention of the present invention, an exhaust gas purification device includes an upstream cylinder provided in an exhaust gas passage of an engine mounted on a vehicle body, a downstream cylinder disposed on a downstream side of the upstream cylinder, and a purifying cylinder that is removably serially connected between and coaxially with the upstream cylinder and the downstream cylinder. The purifying cylinder accommodates a purifying processing member that is configured to allow exhaust gas to flow therethrough to purify the exhaust gas. The upstream cylinder, the purifying cylinder, and the downstream cylinder each have at an end thereof a flange portion having a flat connecting surface, and the upstream cylinder. The purifying cylinder, and the downstream cylinder are brought into contact with and connected to each other at the connecting surfaces. Each flange portion of one of the upstream and downstream flange portions of the purifying cylinder, and the flange portions of the upstream cylinder and the downstream cylinder includes an engagement pin protruding in an axial direction by a predetermined height from the connecting surface. The engagement pin has an engagement recess portion that is recessed inward in a radial direction orthogonal to the axial direction by a predetermined depth from an outer circumferential surface across an entire width and extends outward in the axial direction from the connecting surface by a predetermined width. Each flange portion of the other of the upstream and downstream flange portions of the purifying cylinder, and the flange portions of the upstream cylinder and the downstream cylinder includes a pin hole that is formed at a position of the connecting surface that faces the engagement pin, and into which the engagement pin is inserted, and an engagement groove formed along a circumferential direction of each flange portion of the other, and extending in a mounting rotation direction of the purifying cylinder by a predetermined length continuously from an inner circumferential surface of the pin hole, wherein the engagement recess portion is fitted into and engaged with the engagement groove. A depth dimension of the engagement groove on a deep end side thereof in the circumferential direction is substantially the same as a length of the engagement recess portion in the axial direction.

Next, the second invention of the present invention is the exhaust gas purification device according to the above first invention. In the exhaust gas purification device, the engagement grooves each include a pin moving groove formed along the circumferential direction of each flange portion so as to extend in the mounting rotation direction of the purifying cylinder continuously from the inner circumferential surface of the pin hole, a guide rib portion protruding inward in the radial direction orthogonal to the axial direction across an entire length in the circumferential direction by a protruding height that is substantially the same as the depth dimension of the engagement recess portion from an edge portion of the inner circumferential surface that is located outward in the radial direction, of the pin moving groove. The edge portion is positioned on the outside of the inner circumferential surface in an axial direction of the pin moving groove. The engagement recess portions are each fitted between the inner circumferential surface of the pin moving groove inward in the radial direction orthogonal to the axial direction and the guide rib portion, and engaged. A thickness dimension of the guide rib portions on a deep end side thereof in the circumferential direction is substantially the same as the length dimension of the engagement recess portion in the axial direction.

Next, the third invention of the present invention is the exhaust gas purification device according to the above second invention. In the exhaust gas purification device, the guide rib portions each have at an end thereof on the pin hole side a thickness dimension that is smaller than the length dimension of the engagement recess portions in the axial direction, wherein the thickness dimension is increased as the guide rib portion extends from the end thereof on the pin hole side toward the deep end side thereof in the circumferential direction.

Next, the fourth invention of the present invention is the exhaust gas purification device according to any one of the above first invention to the third invention. In the exhaust gas purification device, the engagement pins each protrude from the connecting surface of the flange portion on a front side of an insertion direction in which the purifying cylinder is inserted between the upstream cylinder and the downstream cylinder when the purifying cylinder is mounted.

Next, the fifth invention of the present invention is the exhaust gas purification device according to any one of the above first invention to the fourth invention. In the exhaust gas purification device, each flange portion of the one of the upstream and downstream flange portions of the purifying cylinder, and the flange portions of the upstream cylinder and the downstream cylinder includes an insertion rib portion that has a ring shape, and is positioned inward of the engagement pin in the radial direction orthogonal to the axial direction. The insertion rib portion protrudes outward in the axial direction by a predetermined height, and extends over the whole circumference in the circumferential direction. Each flange portion of the other of the upstream and downstream flange portions of the purifying cylinder, and the flange portions of the upstream cylinder and the downstream cylinder includes an insertion groove that has a circular shape in a front view, and is formed over the whole circumference at a position of the flange portion facing the insertion rib portion, wherein the insertion rib portion is inserted into the insertion groove.

Next, the sixth invention of the present invention is the exhaust gas purification device according to the above fifth invention. In the exhaust gas purification device, the engagement pins protrude from the connecting surfaces of the upstream flange portion and the downstream flange portion of the purifying cylinder. Each of the upstream flange portion and the downstream flange portion has a gasket insertion groove that extends over the whole circumference in the circumferential direction of the flange portion along a proximal end portion of the insertion rib portion outward in the radial direction orthogonal to the axial direction, and is concaved inward in the axial direction by a predetermined depth, and a gasket inserted into the gasket insertion groove while the insertion rib portion is inserted through the gasket. The gaskets are disposed between the upstream flange portion and the downstream flange portion of the purifying cylinder, and between the flange portions of the upstream cylinder and the downstream cylinder.

Next, the seventh invention of the present invention is the exhaust gas purification device according to any one of the above first invention to the sixth invention. In the exhaust gas purification device, the upstream cylinder is fixed onto the vehicle body via a first support member. The downstream cylinder is fixed onto the vehicle body via a second support member with a bolt. The second support member has a long hole that is long in the axial direction, and through which the bolt is inserted. The exhaust gas purification device has clamping members that each have a U-shaped or V-shaped grooves in a cross sectional view. The grooves are oriented inward to cooperate to form an annular shape. The flange portions of the upstream and downstream flange portions of the purifying cylinder, and the flange portions of the upstream cylinder and the downstream cylinder, which face each other, are held by the grooves of the respective clamping members to connect with each other removably.

Advantageous Effects of Invention

According to the first invention, the engagement pin protruding in the axial direction of the exhaust gas purification device from the connecting surface of each flange portion of the one of the upstream and downstream flange portions of the purifying cylinder, and the flange portions of the upstream cylinder and the downstream cylinder by the predetermined height and the pin hole formed on the connecting surface of each flange portion of the other of the upstream and downstream flange portions of the purifying cylinder, and the flange portions of the upstream cylinder and the downstream cylinder are disposed at a position facing each other. Thus, by inserting the engagement pins to the pin holes facing the respective engagement pins, the purifying cylinder is positioned coaxially with the upstream cylinder and the downstream cylinder. Then, in this state, the purifying cylinder is rotated in the mounting rotation direction relative to the upstream cylinder and the downstream cylinder, so that the engagement recess portions formed in the proximal ends of engagement pins are engaged with the engagement grooves. The purifying cylinder is connected to the upstream cylinder and the downstream cylinder while the connecting surfaces of the flange portions facing each other are in contact with each other because the depth dimension of the engagement groove on a deep end side thereof in the circumferential direction is substantially the same as the length dimension of the engagement recess portion in the axial direction of the exhaust gas purification device.

With this configuration, by inserting the engagement pins to the pin holes facing the engagement pins, rotating the purifying cylinder in the mounting rotation direction, and fitting the engagement recess portions of the engagement pins into the respective engagement grooves and engaging them, the purifying cylinder is positioned coaxially with the upstream cylinder and the downstream cylinder, and is positioned relative to the upstream cylinder and the downstream cylinder in the axial direction of the exhaust gas purification device. Thus, the workability of mounting the purifying cylinder between the upstream cylinder and the downstream cylinder is improved with a simple structure. In addition, the purifying cylinder is connected to the upstream cylinder and the downstream cylinder while the connecting surfaces of the flange portions facing each other are in contact with each other. This restricts the occurrence of the creep of the clamping members that each have a U-shaped or V-shaped cross section and tightens the flange portions facing each other, so that hermeticity of the sealing may be maintained by the gaskets mounted between the flange portions facing each other.

According to the second invention, the engagement recess portions of the engagement pins are each fitted and engaged between the guide rib portion and the inner circumferential surface of the pin moving groove inward in the radial direction orthogonal to the axial direction of the exhaust gas purification device. Then, the purifying cylinder is rotated in the mounting rotation direction relative to the upstream cylinder and the downstream cylinder. When the engagement recess portions are brought to the deep end side of the guide rib portions in the circumferential direction, the engagement recess portions are fitted into the guide rib portions, so that the guide rib portions are brought into contact with the connecting surfaces of the flange portions facing the guide rib portion. Thus, the purifying cylinder is connected to the upstream cylinder and the downstream cylinder with a simple structure while the connecting surfaces of the flange portions of the purifying cylinder and the connecting surfaces of the flange portions of the upstream cylinder and the downstream cylinder are surely in contact with each other.

According to the third invention, the thickness dimension of the guide rib portions at the end thereof on the pin hole side is formed smaller than the length dimension of the engagement recess portions in the axial direction of the exhaust gas purification device. The guide rib portions are each formed so that the thickness dimension of the guide rib portion is increased as the guide rib portion extends from the end thereof on the pin hole side toward the deep end side thereof in the circumferential direction. With this configuration, the end of each guide rib portion on the pin hole side is smoothly fitted into the engagement recess portion of the engagement pin inserted into the pin hole. The worker easily rotates the purifying cylinder in the mounting rotation direction while the purifying cylinder is positioned coaxially with the upstream cylinder and the downstream cylinder, so that the engagement pins are smoothly fitted into the engagement grooves toward the deep end thereof in the circumferential direction.

According to the fourth invention, the engagement pins protrude from the connecting surfaces of the flange portions on the front side of the insertion direction in which the purifying cylinder is inserted between the upstream cylinder and the downstream cylinder, when the purifying cylinder is mounted. With this configuration, when the worker mounts the purifying cylinder between the upstream cylinder and the downstream cylinder, the worker may insert the engagement pins into the pin holes facing the respective engagement pins, while visually checking them, so that the work of mounting the purifying cylinder is quickened.

According to the fifth invention, when the engagement pins are inserted into the pin holes facing the respective engagement pins, the insertion rib portions are inserted into the insertion grooves. The insertion rib portions each have an ring shape, protrude outward of the connecting surface of each flange portion of the one of the upstream and downstream flange portions of the purifying cylinder, and the flange portions of the upstream cylinder and the downstream cylinder in the axial direction of the exhaust gas purification device by the predetermined height, and extend over the whole circumference in the circumferential direction. The insertion grooves each have a circular shape in a front view, and are formed over the whole circumference at a position of the connecting surface of each flange portion of the other facing the insertion rib portion. With this configuration, by inserting the engagement pins to the pin holes facing the respective engagement pins, the purifying cylinder is tumably supported coaxially with the upstream cylinder and the downstream cylinder, so that the work of mounting the purifying cylinder is further quickened.

According to the sixth invention, by inserting insertion rib portions to the insertion grooves formed in flange portions of the upstream cylinder and the downstream cylinder while the gaskets are inserted into the gasket insertion grooves provided in the flange portions of the purifying cylinder, the gaskets are disposed between the upstream flange portion and the downstream flange portion of the purifying cylinder, and the respective flange portions of the upstream cylinder and the downstream cylinder. Thus, the work of mounting the gasket between the upstream cylinder and the purifying cylinder, and the work of mounting the gasket between the downstream cylinder and the purifying cylinder are performed at the same time, so that the workability of mounting the purifying cylinder between the upstream cylinder and the downstream cylinder is further improved.

According to the seventh invention, the bolt with which the second support member is fixed is loosened after removing the clamping members. Subsequently, the purifying cylinder is rotated in the removing rotation direction, and the engagement pins are positioned in the pin holes. By moving the downstream cylinder outward in the axial direction (the downstream side) of the exhaust gas purification device, the purifying cylinder is removed from the upstream cylinder and the downstream cylinder. In addition, after the engagement pins are inserted into the pin holes, the purifying cylinder is rotated in the mounting rotation direction, and the clamping members are attached to the flange portions. Furthermore, the bolt with which the second support member is fixed is tightened to fix the second support member, so that the purifying cylinder is connected between the upstream cylinder and the downstream cylinder. Thus, the workability of mounting and removing the purifying cylinder disposed between the upstream cylinder and the downstream cylinder is further improved.

DESCRIPTION OF EMBODIMENTS

The following will describe an exemplary embodiment according to the present invention in which an exhaust gas purification device of the present invention is applied to a forklift with reference to the drawings. First, an overall structure of a forklift 10 on which an exhaust gas purification device 21 is mounted will be described with reference to FIGS. 1 and 2. It is noted that arrows RR and UPR indicated in FIGS. 1 and 2 show the rear side and the upper side of the vehicle, respectively.

Figure 1:
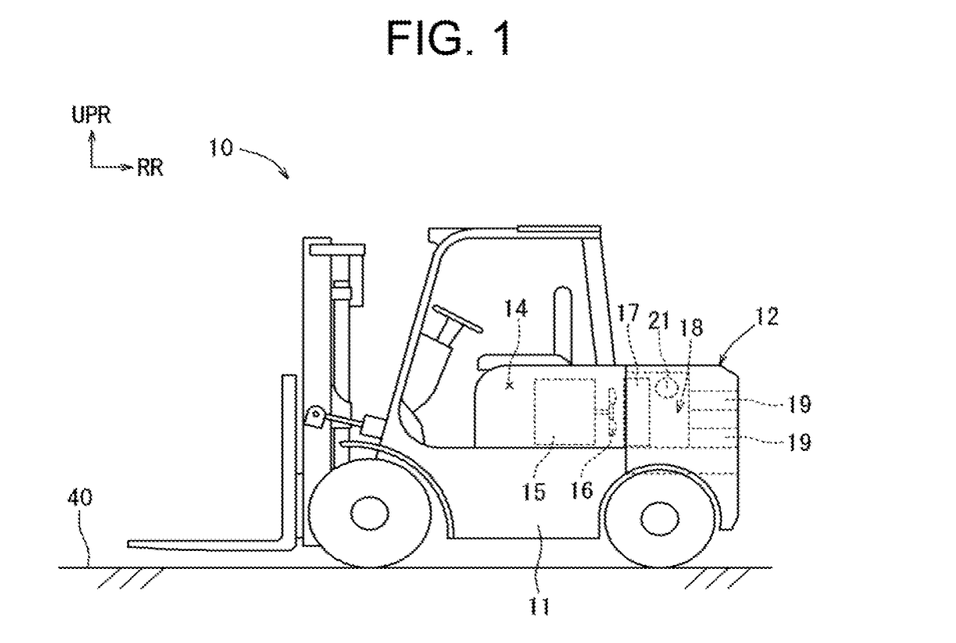
FIG. 1 is a side view of an example of a forklift that includes an exhaust gas purification device according to a present embodiment.
Figure 2:
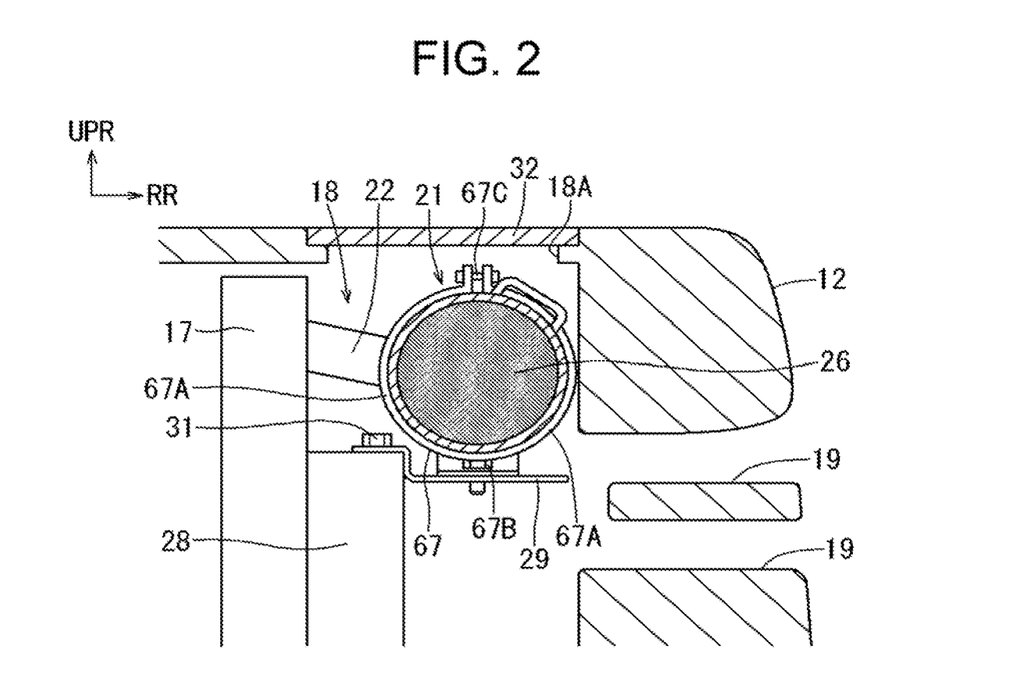
FIG. 2 is a cross-sectional side view of a main part of the forklift showing the exhaust gas purification device disposed in a counterweight.

As illustrated in FIG. 1, the forklift 10 includes a vehicle body 11 and a counterweight 12 which is mounted on a rear part of the vehicle body 11. An engine 15 is mounted in an engine compartment 14 of the vehicle body 11. The engine 15 is configured by a diesel engine, for example. The engine compartment 14 has in a side wall thereof an outside air intake port, which is not illustrated. A fan 16 which is driven or rotated by the engine 15 is provided on the rear side of the engine 15.

A radiator 17 configured to cool the coolant of the engine 15 is disposed on the rear side of the fan 16. The fan 16 is driven by the engine 15 to take outside air (air) into the engine compartment 14 through the outside air intake port and then blow the air onto the radiator 17. With this operation, the coolant of the engine 15 is cooled. The air blown onto the radiator 17 flows through a ventilation chamber 18, which is a substantially box-shaped chamber having an open front side and is formed on the rear side of the radiator 17, and then is blown toward the rear side of the vehicle through a pair of rear air outlet ports 19 formed through a rear wall portion of the counterweight 12 in the back and force direction of the vehicle body 11. For example, the rear air outlet ports 19 extending through the rear wall portion of the counterweight 12 are each formed to have a rectangular cross section which is long in the vehicle width direction, and are arranged in the vertical direction in the rear wall portion of the counterweight 12 such that the upper and lower rear air outlet ports 19 are parallel to each other.

Further, in the ventilation chamber 18, an exhaust gas purification device 21 is disposed on the rear side of the radiator 17 so as to extend along the vehicle width direction, and an exhaust pipe 22 that forms a part of an exhaust gas passage through which exhaust gas is discharged is connected to an upstream side of the exhaust gas purification device 21. Thus, the exhaust gas purification device 21 and the exhaust pipe 22 cooperate to form the exhaust gas passage. While the exhaust gas flows from the upstream side to the downstream side, the exhaust gas purification device 21 removes hazardous substances contained in the exhaust gas.

It is to be noted that, although the engine 15 is high-efficient and superior in the durability, hazardous substances, such as particulate matter (PM), nitrogen oxide (NOx), carbon monoxide (CO), and hydrocarbon (HC), may be discharged with the exhaust gas. In view of this, the exhaust gas purification device 21 connected to the exhaust pipe 22 is configured to include an oxidation catalyst (diesel oxidation catalyst or DOC) 25 (see FIG. 3) disposed on the upstream side thereof and a DPF 26 (see FIG. 3) disposed on the downstream side thereof. The DOC 25 oxidizes and removes nitrogen oxide (NOx), carbon monoxide (CO), hydrocarbon (HC), etc. The DPF 26 is configured to capture and remove particulate matter (PM).

Figure 3:
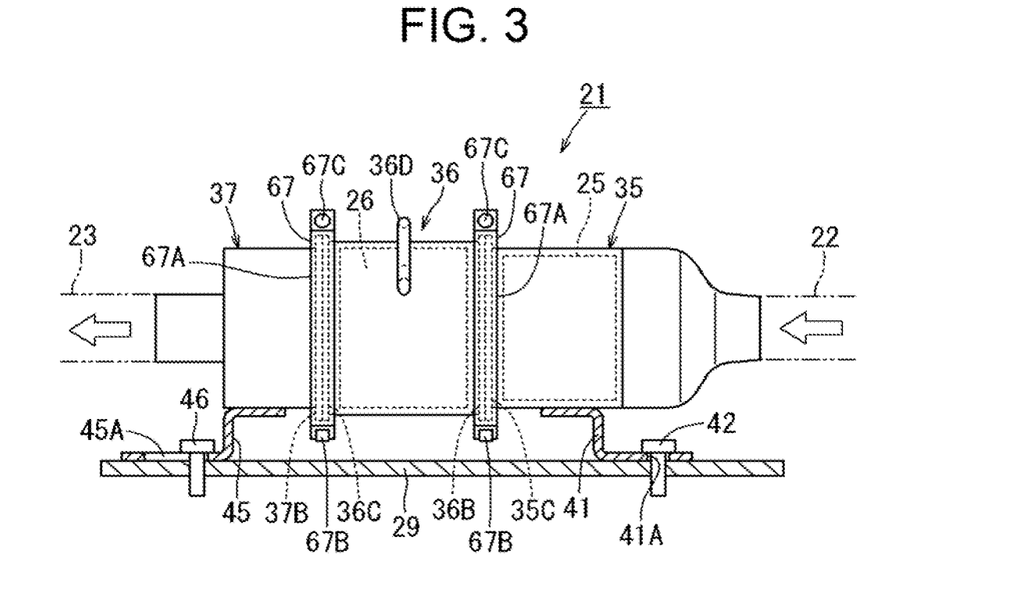
FIG. 3 is a front view of the exhaust gas purification device.

The exhaust gas purification device 21 is mounted on a purification device supporting bracket 29 disposed in the ventilation chamber 18, and disposed near a top portion of the ventilation chamber 18 so as to extend along the vehicle width direction. As illustrated in FIGS. 2 and 3, the purification device supporting bracket 29 is formed to have a rectangular shape which is long in the vehicle width direction in a plan view, and opposite end portions of the purification device supporting bracket 29 in the vehicle width direction at a front edge portion thereof are fixed on upper end portions of a pair of struts 28 with bolts 31. The struts 28 are provided upright so as to face opposite end portions of the ventilation chamber 18 in the vehicle width direction.

The ventilation chamber 18 has in the top portion thereof an opening 18A which is opened upward and has a rectangular shape that is long in the vehicle width direction in a plan view. The opening 18A is closed by a plate-like lid member 32 having a rectangular shape that is long in the vehicle width direction in a plan view. The lid member 32 is placed on the opening 18A and fixed with bolts or the like. Accordingly, as described later, this configuration permits a worker to mount and remove the DPF 26 of the exhaust gas purification device 21 through the opening 18A by removing the lid member 32.

Figure 4:
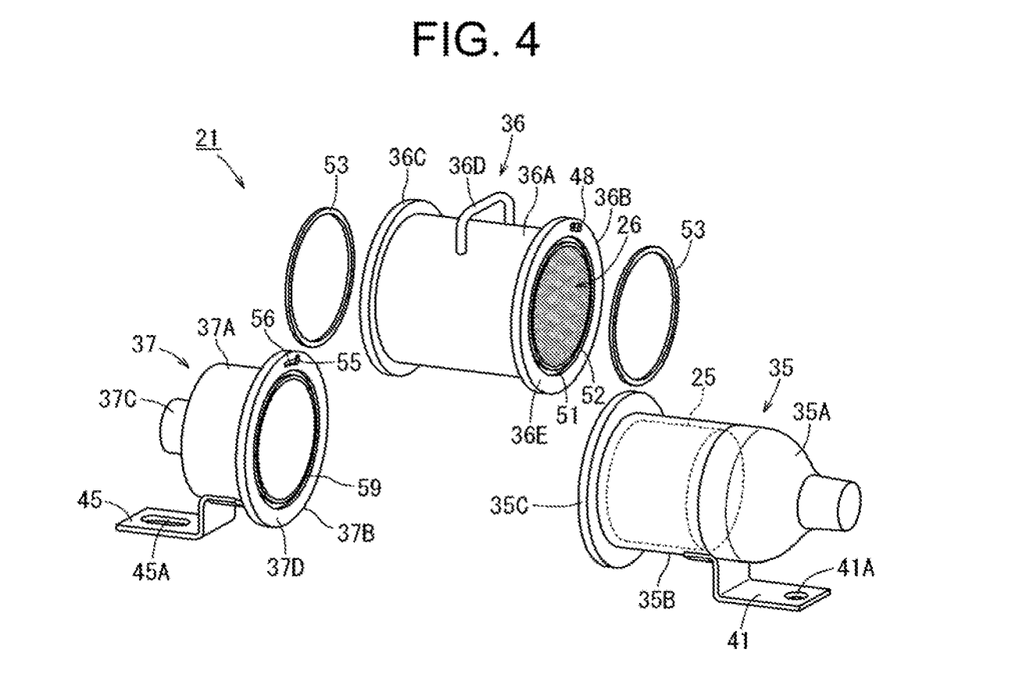
FIG. 4 is an exploded perspective view of the exhaust gas purification device.

Next, the configuration of the exhaust gas purification device 21 will be described with reference to FIGS. 3 to 14. As illustrated in FIGS. 3 and 4, the exhaust gas purification device 21 includes an upstream cylinder 35 disposed on the upstream side of the exhaust gas purification device 21, a downstream cylinder 37 disposed on the downstream side of the exhaust gas purification device 21, and a purifying cylinder 36 that is removably serially connected between and coaxially with the upstream cylinder 35 and the downstream cylinder 37. An oxidation catalyst 25 are accommodated in the upstream cylinder 35, and the DPF 26 are accommodated in the purifying cylinder 36.

As illustrated in FIG. 4, the upstream cylinder 35 includes an introducing cylinder portion 35A into which exhaust gas is introduced, a cylinder portion 35B, a flange portion 35C, and the oxidation catalyst 25 accommodated in the cylinder portion 35B. The introducing cylinder portion 35A is formed to have a circular cross section whose diameter is gradually expanded as the introducing cylinder portion 35A extends toward the downstream side in the axial direction (left side in FIG. 4) of the exhaust gas purification device 21. An end portion of the introducing cylinder portion 35A on the upstream side is connected to the exhaust pipe 22. The cylinder portion 35B is cylindrically formed, and the whole circumference of an upstream end portion of the cylinder portion 35B is connected by welding or the like to a downstream end portion of the introducing cylinder portion 35A that has the expanded diameter. The oxidation catalyst 25 formed in a substantially columnar shape is fitted in the cylinder portion 35B substantially across the entire length of the cylinder portion 35B.

Figure 5:
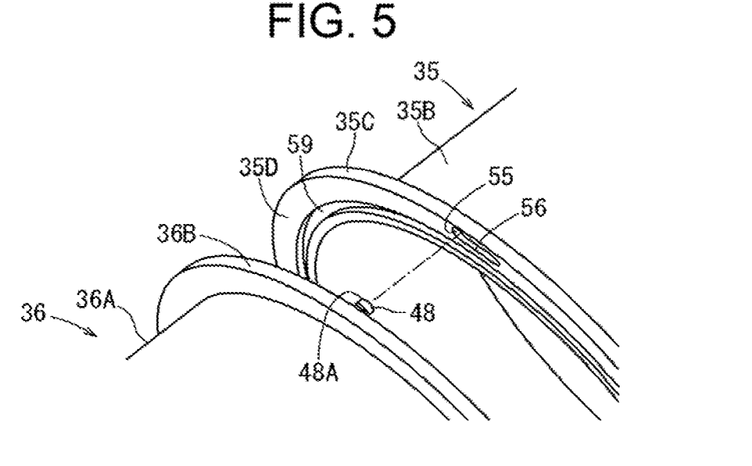
FIG. 5 is an enlarged perspective view partially illustrating an engagement pin facing a pin hole.
Figure 10:
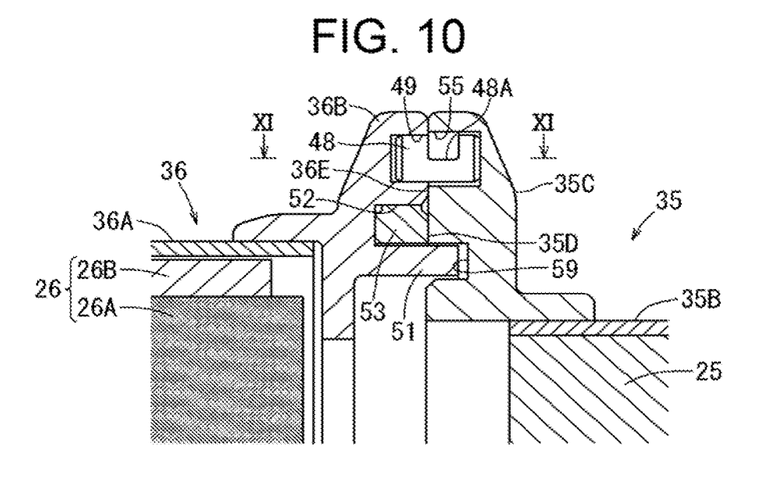
FIG. 10 is a side sectional view illustrating the engagement pin inserted into the pin hole.

The whole circumference of the flange portion 35C is connected by welding or the like to a downstream end portion of the cylinder portion 35B so that the flange portion 35C has a shape of a collar (see FIG. 10). As illustrated in FIG. 5, a connecting surface 35D which is the downstream end face of the flange portion 35C is formed in an annular flat face, and is positioned orthogonally to the axial direction of the exhaust gas purification device 21. The connecting surface 35D is brought into contact with and connected to an upstream flange portion 36B of the purifying cylinder 36 (see FIG. 10 or the like), as described later.

The oxidation catalyst 25 is formed of a ceramic cellular cylinder body having an outer diameter that is substantially the same as the inner diameter of the cylinder portion 35B. The oxidation catalyst 25 has a large number of through holes extending in the axial direction of the oxidation catalyst 25. The inner surface of the oxidation catalyst 25 is coated with a precious metal, such as platinum (Pt). Exhaust gas at a specified temperature is flowed through a large number of the through holes of the oxidation catalyst 25 to oxidize and remove nitrogen oxide (NOx), carbon monoxide (CO), hydrocarbon (HC), etc. contained in the exhaust gas.

As illustrated in FIGS. 3 and 4, the upstream cylinder 35 having the above-described configuration includes a first plate-like support member 41 bent in a crank shape in a side view on the bottom surface side of the cylinder portion 35B. An upper end face of the first support member 41 is fixed by welding or the like to the bottom surface side of the cylinder portion 35B so that a lower end portion of the first support member 41 is located under the introducing cylinder portion 35A. The first support member 41 has a through hole 41A formed in the lower end portion thereof. The first support member 41 is placed on the upper surface of the purification device supporting bracket 29 and fixed with a bolt 42 inserted through the through hole 41A. In this way, the upstream cylinder 35 is fixed onto the purification device supporting bracket 29 via the first support member 41.

As illustrated in FIG. 4, the downstream cylinder 37 includes a cylinder portion 37A, a flange portion 37B, and a discharge cylinder portion 37C through which exhaust gas is discharged. The exhaust gas that has passed through the DPF 26 accommodated in the purifying cylinder 36 is introduced into the cylinder portion 37A. An outer diameter of the cylinder portion 37A is substantially the same as that of the cylinder portion 35B of the upstream cylinder 35, and the cylinder portion 37A is formed in a cylindrical shape that has the slightly smaller length than that of the cylinder portion 35B in the axial direction of the exhaust gas purification device 21. A downstream end of the cylinder portion 37A is closed. The cylinder portion 37A has at a center portion thereof a through hole having the substantially same diameter as that of the discharge cylinder portion 37C. The discharge cylinder portion 37C is connected by welding or the like to an outer end of the cylinder portion 37A around the thorough hole so as to be coaxially with the cylinder portion 37A in the axial direction. The discharge cylinder portion 37C is connected to a muffler (muffler) disposed on the downstream side thereof via an exhaust pipe 23 (see FIG. 3). The muffler is not herein illustrated.

The whole circumference of the flange portion 37B is connected by welding or the like to an upstream end portion of the cylinder portion 37A so that the flange portion 37B has a shape of a collar. The flange portion 37B is formed to be plane-symmetrical with the flange portion 35C of the above-described upstream cylinder 35. Thus, a connecting surface 37D which is an upstream end face of the flange portion 37B is formed in an annular flat face, and is positioned orthogonally to the axial direction of the exhaust gas purification device 21. The connecting surface 37D is brought into contact with and connected to a downstream flange portion 36C of the purifying cylinder 36 (see FIGS. 3 and 10), as described later.

As illustrated in FIGS. 3 and 4, the downstream cylinder 37 having the above-described configuration includes a second plate-like support member 45 bent in a crank shape in a side view on the bottom surface side of the cylinder portion 37A. An upper end face of the second support member 45 is fixed by welding or the like to the bottom surface side of the cylinder portion 37A so that a lower end portion of the second support member 45 is located on the downstream side far from the cylinder portion 37A in the axial direction of the exhaust gas purification device 21. The second support member 45 has a long hole 45A that is long in the axial direction and is positioned in the lower end portion of the second support member 45. The second support member 45 is placed on the upper surface of the purification device supporting bracket 29 and fixed with a bolt 46 inserted through the long hole 45A.

Figure 14:
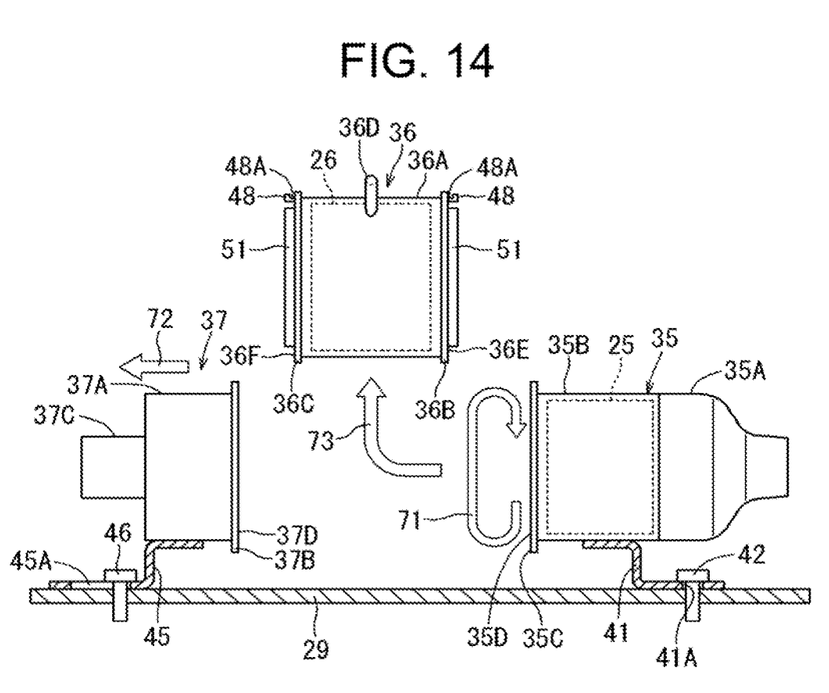
FIG. 14 is an explanatory view describing steps of removing the purifying cylinder from the upstream cylinder and the downstream cylinder.

As illustrated in FIG. 3, when the purifying cylinder 36 is mounted between and coaxially with the upstream cylinder 35 and the downstream cylinder 37, the bolt 46 is positioned near one end of the long hole 45A on the downstream side of the exhaust gas purification device 21 and tightened. As illustrated in FIG. 14, when the purifying cylinder 36 is removed from between the upstream cylinder 35 and the downstream cylinder 37, the bolt 46 is slightly loosened and positioned near the other end of the long hole 45A on the upstream side of the exhaust gas purification device 21. Thus, the downstream cylinder 37 is movable back and forth in the axial direction of the exhaust gas purification device 21 for the length of the long hole 45A on the purification device supporting bracket 29 via the second support member 45.

As illustrated in FIGS. 4 and 14, the purifying cylinder 36 includes a cylindrical cylinder portion 36A into which the exhaust gas that has passed through the oxidation catalyst 25 accommodated in the upstream cylinder 35 is introduced, an upstream flange portion 36B, a downstream flange portion 36C, a handle 36D, and a DPF 26 accommodated in the cylinder portion 36A. The cylinder portion 36A is formed in a cylindrical shape having an outer diameter that is substantially the same as that of the cylinder portion 35B of the upstream cylinder 35. The DPF 26 formed in a substantially columnar shape is fitted in the cylinder portion 36A substantially across the entire length thereof.

The whole circumference of the upstream flange portion 36B is connected by welding or the like to an upstream end of the cylinder portion 36A so that the upstream flange portion 36B has a shape of a collar. The whole circumference of the downstream flange portion 36C is connected by welding or the like to a downstream end of the cylinder portion 36A so that the downstream flange portion 36C has a shape of a collar. The upstream flange portion 36B and the downstream flange portion 36C have the same configuration. A connecting surface 36E which is an upstream end face of the upstream flange portion 368 is formed in an annular flat face, and is positioned orthogonally to the axial direction of the exhaust gas purification device 21. The connecting surface 36E is brought into contact with and connected to the connecting surface 35D of the flange portion 35C of the upstream cylinder 35, as described later (see FIG. 10).

A connecting surface 36F (see FIG. 14) which is a downstream end face of the downstream flange portion 36C is formed in an annular flat face, and is positioned orthogonally to the axial direction of the exhaust gas purification device 21. The connecting surface 36F is brought into contact with and connected to the connecting surface 37D of the flange portion 37B of the downstream cylinder 37, as described later. The cylinder portion 36A has a bar-shaped handle 36D bent in a substantially U-shape at a middle position of the outer circumferential surface of the cylinder portion 36A in the axial direction. The handle 36D is connected by welding or the like to the outer circumferential surface of the cylinder portion 36A so that opposite ends of the handle 36D are arranged along the circumferential direction. With this configuration, a worker can carry the purifying cylinder 36 by holding the handle 36D.

As illustrated in FIG. 10, the DPF 26 includes a columnar filter body 26A formed by a porous member made of a ceramic material or the like, and a cylindrical thermal insulation member 26B as a buffer formed over the whole circumference of the outer periphery of the filter body 26A. The filter body 26A is a cellular cylindrical member having honeycomb-structure in which a large number of small holes are formed in the axial direction of the exhaust gas purification device 21. Ends of the adjacent small holes, which alternately differ from each other, are closed by a seal member. The filter body 26A captures particulate matter by allowing exhaust gas flowing into the respective small holes from the upstream side through the porous member, and allows only the exhaust gas to flow out to the downstream side through the adjacent small holes.

In this case, the particulate matter captured by the filter body 26A is periodically combusted and removed by increasing the temperature of the exhaust gas. Part of the particulate matter combusted to ashes gradually accumulates in the small holes. The remaining unburnt particulate matter, such as heavy metal, calcium, etc. in the engine oil also gradually accumulates. Thus, the exhaust gas purification device is configured so that the DPF 26 may be cleaned by removing the purifying cylinder 36 (see FIG. 14), as described later.

Figure 6:
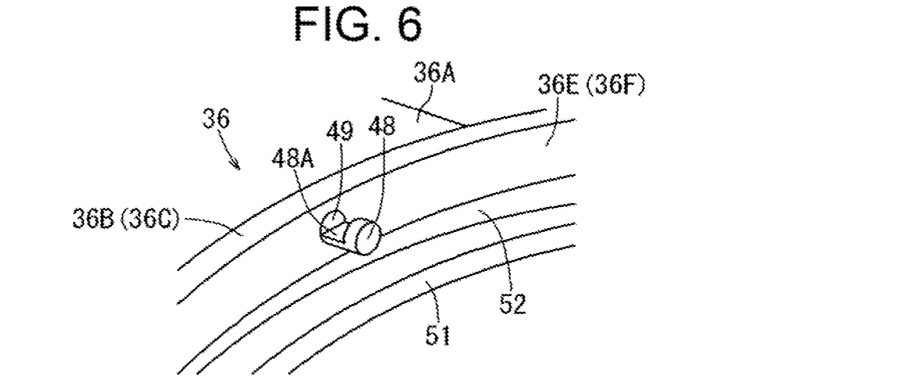
FIG. 6 is an enlarged perspective view partially illustrating the engagement pin protruding from a flange portion of a purifying cylinder.

As illustrated in FIGS. 4, 6, and 14, engagement pins 48 protrude in opposite directions in the axial direction of the exhaust gas purification device 21 by a predetermined length from the connecting surface 36E of the upstream flange portion 36B and the connecting surface 36F of the downstream flange portion 36C. The engagement pins 48 are positioned coaxially with each other at a position near outer circumferential edge portions of the connecting surface 36E and the connecting surface 36F in a radial direction of the exhaust gas purification device 21, corresponding to a middle position of the handle 36D in the longitudinal direction thereof. Insertion rib portions 51 each having a ring shape in a front view, and positioned inward of the engagement pins 48 in the radial direction of the cylinder portion 36A are provided on the connecting surface 36E and the connecting surface 36F. The insertion rib portions 51 protrude outward in the axial direction so that the insertion rib portions 51 are formed coaxially with the cylinder portion 36A. The insertion rib portions 51 extend over the whole circumference in the circumferential direction. The protruding height of each insertion rib portion 51 outward in the axial direction is substantially the same as those of the engagement pins 48. Also, the insertion rib portions 51 each have a predetermined thickness in the radial direction.

The connecting surface 36E and the connecting surface 36F have gasket insertion grooves 52 each extending over the whole circumference in the circumferential direction along a proximal end portion of one insertion rib portion 51 outward in the radial direction of the exhaust gas purification device 21. Each of the gasket insertion grooves 52 is concaved inward in the axial direction of the exhaust gas purification device 21 and is formed to have a U-shaped cross section in the radial direction. A ring-shaped gasket 53 has a substantially rectangular cross section and is inserted in each of the insertion rib portions 51. The insertion rib portions 51 with the gaskets 53 are inserted into the respective gasket insertion grooves 52 (see FIG. 10), as described later.

As illustrated in FIGS. 6 and 10, each of the engagement pins 48 is formed in a substantially columnar shape. An end part of the engagement pin 48 is inserted by one third of the substantially entire length thereof to a bottomed mounting hole 49 that has a circular cross section and is formed on each of the connecting surface 36E and the connecting surface 36F, and fixed by press-fitting, welding, or the like. Each of the engagement pins 48 has an engagement recess portion 48A that is recessed in a U-shape in a side view. The engagement recess portions 48A extend outward in the axial direction of the exhaust gas purification device 21 from the connecting surface 36E and the connecting surface 36F. The length dimension of the engagement recess portions 48A is about one third of the entire length of engagement pins 48 in the axial direction. Each of the engagement recess portions 48A is recessed by a predetermined depth (for example, a depth substantially equal to a radius of the engagement pins 48) downwardly from an upper top of the outer circumferential surface of each of the engagement pins 48 in the vertical direction in FIG. 6, across the entire width of the engagement pin 48 in the tangential direction of the top.

As illustrated in FIGS. 4, 5, 7, 8, and 10, when the purifying cylinder 36 is disposed coaxially with and between the upstream cylinder 35 and the downstream cylinder 37, the connecting surface 35D of the flange portion 35C of the upstream cylinder 35 and the connecting surface 37D of the flange portion 37B of the downstream cylinder 37 each have a pin hole 55 that has a circular cross section and is formed at a position facing each of the engagement pins 48. The engagement pins 48 are inserted into the pin holes 55. The depth of the pin holes 55 is determined to be substantially the same as the protruding height of the engagement pins 48 from the connecting surfaces 36E, 36F of the flange portions 36B, 36C of the purifying cylinder 36. An inner diameter of the pin holes 55 is substantially the same as an outer diameter of the engagement pins 48.

Engagement grooves 56 are formed along the circumferential direction of the flange portions 35C and 37B so as to extend in a mounting rotation direction of the purifying cylinder 36 (herein referring to a near side direction in FIG. 4, that is, a direction in a rear side of the vehicle in FIG. 2) by a predetermined length continuously from inner circumferential surfaces of the respective pin holes 55. The engagement recess portions 48A of the engagement pins 48 inserted into the respective pin holes 55 are fitted into and engaged with the engagement grooves 56 (see FIG. 12), as described later.

Figure 7:
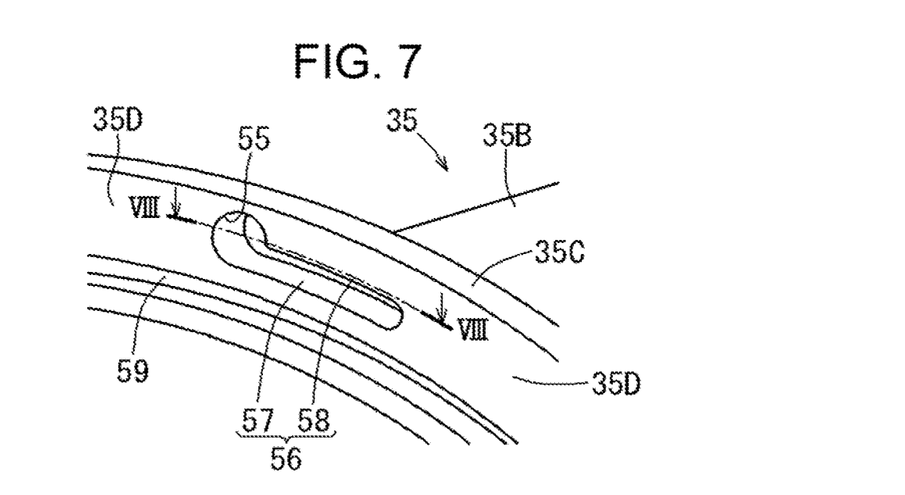
FIG. 7 is an enlarged perspective view partially illustrating a pin hole and an engagement groove formed in a flange portion of an upstream cylinder.
Figure 8:
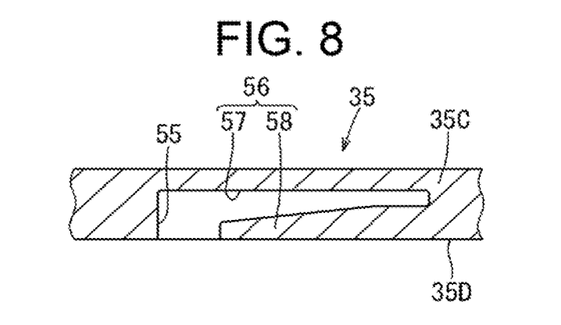
FIG. 8 is a sectional view as viewed in a direction of arrows VIII, VIII of FIG. 7.

The engagement grooves 56 formed on the connecting surface 35D of the flange portion 35C of the upstream cylinder 35 and the connecting surface 37D of the flange portion 37B of the downstream cylinder 37 are plain-symmetrical with each other and each have a substantially the same configuration. Thus, the configuration of the engagement groove 56 formed on the flange portion 35C of the upstream cylinder 35 will be herein described with reference to FIGS. 7 and 8. As illustrated in FIGS. 7 and 8, each of the engagement grooves 56 includes a pin moving groove 57 through which one engagement pin 48 is movable in the mounting rotation direction of the purifying cylinder 36 and a guide rib portion 58 that is inserted into the engagement recess portion 48A of the engagement pin 48, and guides the engagement pin 48 in the mounting rotation direction of the purifying cylinder 36.

The pin moving groove 57 has a width dimension substantially the same as an inner diameter of the pin hole 55 in the vertical direction. The pin moving groove 57 is formed along the circumferential direction of the flange portion 35C so as to extend by a predetermined length (for example, a length that is about 4 to 5 times longer than the diameter of the engagement pin 48) continuously from an inner circumferential surface of the pin hole 55. A depth dimension of the pin moving groove 57 in the axial direction of the exhaust gas purification device 21 is substantially the same as that of the pin hole 55 in the axial direction, that is, the protruding height of the engagement pin 48 from the connecting surface 36E of the upstream flange portion 36B of the purifying cylinder 36.

The guide rib portion 58 protrudes inward in the radial direction of the flange portion 35C across an substantially entire length by a protruding height that is substantially the same as the depth dimension of the engagement recess portion 48A from an edge portion of an upper inner circumferential surface of the pin moving groove 57. The edge portion is positioned on the outside of the upper inner circumferential surface of the pin moving groove 57 in an axial direction of the pin moving groove 57 in FIG. 7. The thickness dimension at end of the guide rib portion 58 on the pin hole 55 side in the axial direction of the exhaust gas purification device 21 is formed smaller than the length dimension of the engagement recess portion 48A in the axial direction. The thickness dimension of the guide rib portion 58 is increased as the guide rib portion 58 extends from the end thereof on the pin hole 55 side toward the deep end side thereof in the circumferential direction. The thickness dimension of the guide rib portion 58 on the deep end side thereof in the circumferential direction is substantially the same as the length dimension of the engagement recess portion 48A of the exhaust gas purification device 21 in the axial direction.

As illustrated in FIGS. 4, 5, 7 and 10, when the purifying cylinder 36 is disposed coaxially with and between the upstream cylinder 35 and the downstream cylinder 37, the connecting surface 35D of the flange portion 35C of the upstream cylinder 35 and the connecting surface 37D of the flange portion 37B of the downstream cylinder 37 each have an insertion groove 59 that has a circular shape in a front view and a substantially U-shaped cross section. Each of the insertion grooves 59 is formed over the whole circumference at a position of each of the connecting surface 35D of the flange portion 35C and the connecting surface 37D of the flange portions 37B facing each of the insertion rib portions 51. The insertion rib portions 51 are inserted into the insertion grooves 59. The depth dimension of the insertion grooves 59 is determined to be substantially the same as the protruding height of the insertion rib portions 51 from the connecting surfaces 36E of the upstream flange portions 368B, and the connecting surface 36F of the downstream flange portion 36C, respectively, of the purifying cylinder 36. The width dimension of the insertion grooves 59 is formed to be substantially the same as the thickness of the insertion rib portions 51 in the radial direction of the exhaust gas purification device 21.

Figure 9:
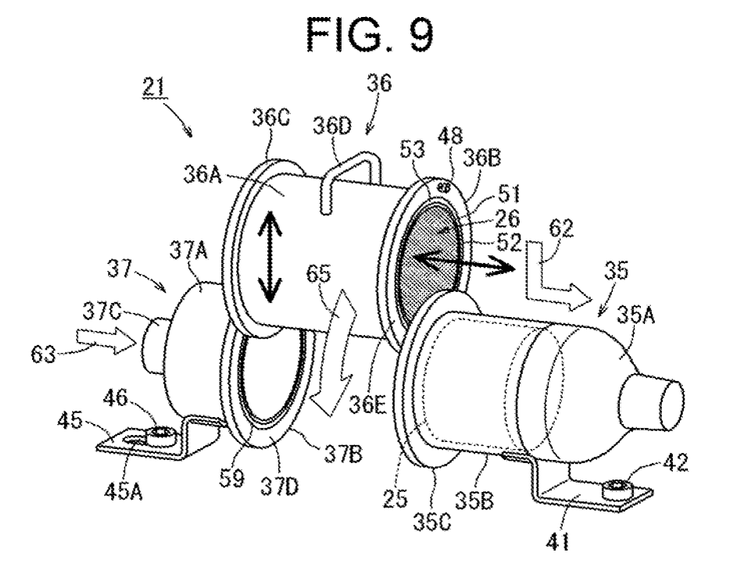
FIG. 9 is an explanatory view describing steps of mounting the purifying cylinder to the upstream cylinder and a downstream cylinder.

Subsequently, steps of mounting the purifying cylinder 36 of the exhaust gas purification device 21 having the above-described configuration between the upstream cylinder 35 and the downstream cylinder 37 will now be described with reference to FIGS. 3, 9, and 13. As illustrated in FIG. 9, first, the worker inserts the ring-shaped gaskets 53 through the insertion rib portions 51 of the upstream flange portion 36B and the downstream flange portion 36C of the purifying cylinder 36, and then further inserts the gaskets 53 into the respective gasket insertion grooves 52. Subsequently, the worker performs the following works through the opening 18A (see FIG. 2) formed in an upper portion of the counterweight 12. First, the worker holds the handle 36D of the purifying cylinder 36, and positions the purifying cylinder 36 between the upstream cylinder and the downstream cylinder 37.

Figure 11:
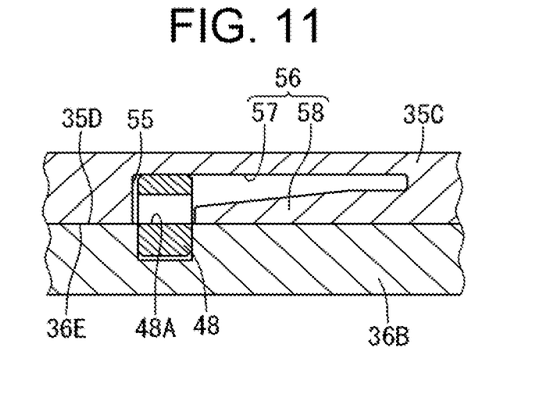
FIG. 11 is a sectional view as viewed in a direction of arrows XI, XI of FIG. 10.

Then, as illustrated in FIGS. 9 to 11, the worker moves the purifying cylinder 36 toward the upstream cylinder 35 (in the direction indicated by an arrow 62 in FIG. 9) to insert the engagement pin 48 of the upstream flange portion 36B of the purifying cylinder 36 into the pin hole 55 of the flange portion 35C of the upstream cylinder 35. At the same time, the worker inserts the insertion rib portion 51 of the upstream flange portion 36B, which has a ring-shape in a front view, into the insertion groove 59 of the flange portion 35C of the upstream cylinder 35.

Then, the worker further moves the purifying cylinder 36 toward the upstream cylinder 35 (in the direction indicated by the arrow 62), thereby crushing the gasket 53 inserted into the gasket insertion groove 52 of the upstream flange portion 36B, so that the connecting surface 36E of the upstream flange portion 36B is brought into contact with the connecting surface 35D of the flange portion 35C facing the connecting surface 36E. It is noted that the upstream cylinder 35 is fixed onto the purification device supporting bracket 29 via the first support member 41 with the bolt 42.

Then, as illustrated in FIG. 9, the worker slightly loosens the bolt 46 inserted through the long hole 45A, and moves the downstream cylinder 37 toward the purifying cylinder 36 (in the direction indicated by an arrow 63) to insert the engagement pin 48 of the downstream flange portion 36C of the purifying cylinder 36 into the pin hole 55 of the flange portion 37B of the downstream cylinder 37. At the same time, the worker inserts the insertion rib portion 51 of the downstream flange portion 36C, which has a ring-shape in a front view, into the insertion groove 59 of the flange portion 37B of the downstream cylinder 37.

Then, the worker further moves the downstream cylinder 37 toward the purifying cylinder 36 (the direction indicated by the arrow 63 in FIG. 9), thereby crushing the gasket 53 inserted into the gasket insertion groove 52 of the downstream flange portion 36C, so that the connecting surface 37D of the flange portion 37B of the downstream cylinder 37 is brought into contact with the connecting surface 36F (see FIG. 14) of the downstream flange portion 36C facing the connecting surface 37D.

In this state, the worker holding the handle 36D rotates the purifying cylinder 36 in the near side direction in FIG. 9 (the direction indicated by an arrow 65), that is, toward the rear side of the vehicle (see FIG. 2). By doing so, the worker moves the engagement pins 48 of the upstream flange portion 36B and the downstream flange portion 36C to deep side ends of the pin moving grooves 57 forming the engagement grooves 56 of the flange portions 35C, 37B of the upstream cylinder 35 and the downstream cylinder 37.

The engagement grooves 56 formed in the flange portions 35C, 37B of the upstream cylinder 35 and the downstream cylinder 37 are plane-symmetrical with each other and have a substantially same configuration. Thus, the configuration of the engagement pin 48 that has been moved to the deep side end of the pin moving groove 57 formed in the flange portion 35C of the upstream cylinder 35 will be herein described with reference to FIGS. 12 and 13.

Figure 12:
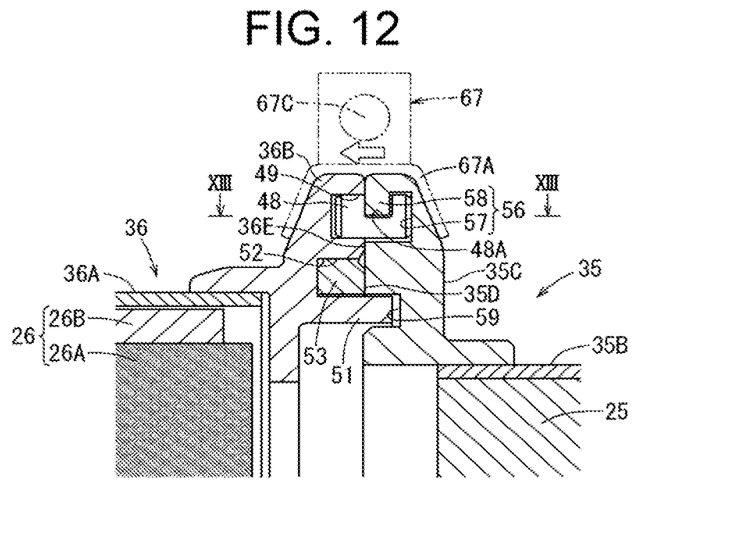
FIG. 12 is a side sectional view illustrating the engagement pin located on the deep end side of the engagement groove in a circumferential direction thereof.
Figure 13:
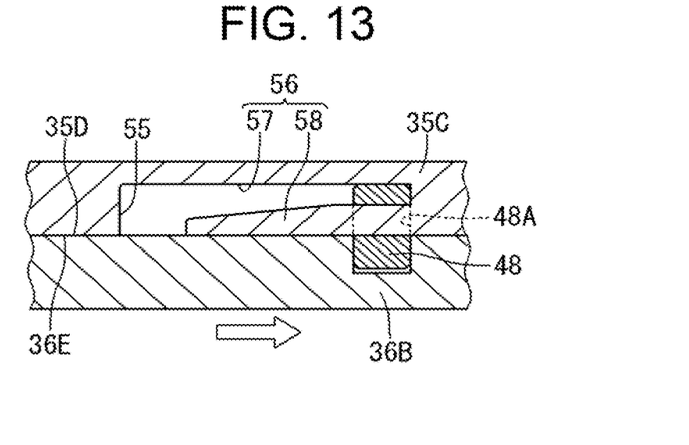
FIG. 13 is a sectional view as viewed in the direction of arrows XIII, XIII of FIG. 12.

As illustrated in FIGS. 12 and 13, when the engagement pin 48 of the upstream flange portion 36B is moved to the deep side end of the pin moving groove 57 forming the engagement groove 56, a deep side end portion of the guide rib portion 58 forming the engagement groove 56 of the flange portion 35C of the upstream cylinder 35 is fitted in the engagement recess portion 48A of the engagement pin 48. Thus, the connecting surface 36E of the upstream flange portion 36B and the connecting surface 35D of the flange portion 35C of the upstream cylinder 35 are brought into contact with each other.

Accordingly, when the engagement pin 48 of the downstream flange portion 36C of the purifying cylinder 36 is moved to the deep side end of the pin moving groove 57 forming the engagement groove 56, a deep side end portion of the guide rib portion 58 forming the engagement groove 56 of the flange portion 37B of the downstream cylinder 37 is fitted in the engagement recess portion 48A of the engagement pin 48. Thus, the connecting surface 36F of the downstream flange portion 36C and the connecting surface 37D of the flange portion 37B of the downstream cylinder 37 are brought into contact with each other, similarly to the connecting surface 36E of the upstream flange portion 36B and the connecting surface 35D of the flange portion 35C of the upstream cylinder 35. With this process, the purifying cylinder 36 is coaxially disposed between the upstream cylinder 35 and the downstream cylinder 37 (the alignment in the radial direction of the exhaust gas purification device 21 is performed). In addition, the alignment in the axial direction of the exhaust gas purification device 21 is performed.

Then, as illustrated in FIG. 3, the worker assembles annular clamping members 67 into outer circumferential portions in the radial direction of the exhaust gas purification device 21 of the upstream flange portion 36B of the purifying cylinder 36 and the flange portion 35C of the upstream cylinder 35, and outer circumferential portions in the radial direction of the downstream flange portion 36C of the purifying cylinder 36 and the flange portion 37B of the downstream cylinder 37. By doing so, the connecting surfaces 35D, 36E and the connecting surfaces 36F, 37D are tightened inward in the axial direction of the exhaust gas purification device 21 by the respective clamping members 67, and are in contact with each other in the axial direction, so that the purifying cylinder 36 is fixed removably.

In this state, the worker tightens the bolt 46 inserted through the long hole 45A of the second support member 45 and fixes the downstream cylinder 37 onto the purification device supporting bracket 29 via the second support member 45. By doing so, as illustrated in FIG. 3, in the exhaust gas purification device 21, the purifying cylinder 36 is disposed coaxially with and between the upstream cylinder 35 and the downstream cylinder 37, and is fixed on the purification device supporting bracket 29 while the alignment of the upstream cylinder 35, the purifying cylinder 36, and the downstream cylinder 37 in the axial direction of the exhaust gas purification device 21 is performed.

The following will describe the clamping members 67 with reference to FIGS. 2, 3, and 12. As illustrated in FIGS. 2, 3, and 12, one clamping member 67 includes two semi-arcuate frame bodies 67A, 67A that each have a substantially U-shaped or V-shaped cross-section (an example of a U-shaped frame body 67A is illustrated in FIG. 12), a hinge portion 67B turnably joining an end of each of the frame bodies 67A, and a bolt-nut type connecting portion 67C connecting the other end of each of the bodies 67A.

By tightening bolts of the connecting portions 67C, the upstream flange portion 36B of the purifying cylinder 36 and the flange portion 35C of the upstream cylinder 35 are fastened in the axial direction of the exhaust gas purification device 21 with one of the clamping members 67. Furthermore, by tightening bolts of the connecting portions 67C, the downstream flange portion 36C of the purifying cylinder 36 and the flange portion 37B of the downstream cylinder 37 are fastened in the axial direction with the other clamping member 67.

Subsequently, steps of removing the purifying cylinder 36 of the exhaust gas purification device 21 having the above-described configuration from between the upstream cylinder 35 and the downstream cylinder 37 will now be described with reference to FIG. 14. It is noted that first, the worker removes the bolts of the connecting portions 67C of the clamping members 67 from nuts, and removes the clamping members 67 through the opening 18A (see FIG. 2) formed in the upper portion of the counterweight 12. Then, the worker performs the following works through the opening 18A formed in the upper portion of the counterweight 12.

As illustrated in FIG. 14, the worker slightly loosens the bolt 46 inserted through the long hole 45A of the second support member 45 so that the downstream cylinder 37 becomes movable toward the downstream side in the axial direction (the left side of FIG. 14) of the exhaust gas purification device 21 and so that the close contact between the connecting surface 35D and the connecting surface 36E, and between the connecting surface 36F and the connecting surface 37D in the axial direction is relieved. In this state, the worker holding handle 36D of the purifying cylinder 36 rotates the purifying cylinder 36 toward a far side direction (a direction indicated by an arrow 71 in FIG. 14), that is, toward the front side of the vehicle (see FIG. 2).

With this process, the worker moves the engagement pins 48 of the upstream flange portion 36B and the downstream flange portion 36C along the pin moving grooves 57 forming the engagement grooves 56 of the flange portions 35C, 37B of the upstream cylinder 35 and the downstream cylinder 37, and positions the engagement pins 48 in the pinholes 55 (see FIGS. 10 and 11). In addition, the worker positions the handle 36D of the purifying cylinder 36 substantially horizontally on an upper portion of the purifying cylinder 36 in the vertical direction.

Subsequently, the worker holding the handle 36D moves the downstream cylinder 37 in a direction away from the purifying cylinder 36, that is, to the downstream side in the axial direction (the direction indicated by an arrow 72 in FIG. 14) of the exhaust gas purification device 21. By doing so, the worker takes out the engagement pin 48 of the downstream flange portion 36C of the purifying cylinder 36 from the pin hole 55 of the flange portion 37B of the downstream cylinder 37, and takes out the insertion rib portion 51 of the downstream flange portion 36C from the insertion groove 59 of the downstream cylinder 37, so that the worker removes the downstream cylinder 37 from the purifying cylinder 36.

Then, the worker holding the handle 36D moves the purifying cylinder 36 substantially horizontally in a direction away from the upstream cylinder 35, that is, to the downstream side in the axial direction (the direction indicated by an arrow 73 in FIG. 14) of the exhaust gas purification device 21. By doing so, the worker takes out the engagement pin 48 of the upstream flange portion 36B of the purifying cylinder 36 from the pin hole 55 of the flange portion 35C of the upstream cylinder 35 and takes out the insertion rib portion 51 of the upstream flange portion 368 from the insertion groove 59 of the flange portion 35C, so that the worker removes the purifying cylinder 36 from the upstream cylinder 35.

Next, the worker holding the handle 36D moves the purifying cylinder 36 upward in the vertical direction (in the direction indicated by the arrow 73 in FIG. 14), that is, to the upper side of the vehicle, and takes out the purifying cylinder 36 out of the vehicle through the opening 18A (see FIG. 2) formed in the upper portion of the counterweight 12. By doing so, the worker removes only the purifying cylinder 36 upward while the upstream cylinder 35 are fixed onto the purification device supporting bracket 29 via the first support member 41 and the bolt 42, and the downstream cylinder 37 is movably mounted on the purification device supporting bracket 29 via the second support member 45 and the bolt 46.

Subsequently, by using an air gun or the like, compressed air is blown onto the filter body 26A of the DPF 26 (see FIG. 10) accommodated in the purifying cylinder 36 to remove ashes of the particulate matter and unburnt residues accumulated in the small holes, so that the DPF 26 is cleaned. Thus, after the cleaning of the DPF 26, the purifying cylinder 36 accommodating the DPF 26 can be mounted again between the upstream cylinder 35 and the downstream cylinder 37 (see FIG. 9).

As described in detail above, in the exhaust gas purification device 21 according to the present embodiment, the gaskets 53 are inserted into the gasket insertion grooves 52 of the upstream flange portion 36B and the downstream flange portion 36C of the purifying cylinder 36. Then, by inserting the engagement pins 48 and the insertion rib portions 51 of the purifying cylinder 36 to the pin holes 55 and the insertion grooves 59 of the upstream cylinder 35 and the downstream cylinder 37, respectively, a misalignment of the purifying cylinder 36 with respect to the upstream cylinder 35 and the downstream cylinder 37 in the radial direction of the exhaust gas purification device 21 is prevented with a simple structure, and the purifying cylinder 36 is positioned coaxially with the upstream cylinder 35 and the downstream cylinder 37.

Subsequently, in this state, when the worker holding the handle 36D rotates the purifying cylinder 36 toward the near side direction and positions the engagement pins 48 on the deep end side of the engagement grooves 56 in the circumferential direction, the guide rib portions 58 are fitted into and engaged with the respective engagement recess portions 48A of the engagement pins 48. With this process, the guide rib portions 58 are brought into contact with the connecting surfaces 36E, 36F of the upstream flange portion 36B and the downstream flange portion 36C of the purifying cylinder 36, and the purifying cylinder 36 is positioned relative to the upstream cylinder 35 and the downstream cylinder 37 in the axial direction of the exhaust gas purification device 21.

Thus, the workability of mounting the purifying cylinder 36 between the upstream cylinder 35 and the downstream cylinder 37 is improved with a simple structure. In addition, the purifying cylinder 36 is connected to the upstream cylinder 35 and the downstream cylinder 37 while the connecting surfaces 36E, 36F of the upstream flange portion 36B and the downstream flange portion 36C are in contact with the connecting surfaces 35D, 37D of the flange portions 35C, 37B facing the connecting surfaces 36E, 36F, respectively. This configuration prevents the occurrence of the creep of the clamping members 67, which each has a U-shaped or V-shaped cross section and with which the upstream flange portion 36B and the flange portion 35C, and the downstream flange portion 36C and the flange portion 37B facing each other are tightened, so that the hermeticity of the sealing may be maintained by the gaskets 53 mounted between the upstream flange portion 36B and the flange portion 35C, and between the downstream flange portion 36C and the flange portion 37B facing each other.

The thickness dimension of the guide rib portions 58 forming the engagement grooves 56 at the ends thereof on the pin holes 55 side is formed smaller than the length dimension of the engagement recess portions 48A in the axial direction of the exhaust gas purification device 21. The thickness dimension of the guide rib portions 58 is increased as the guide rib portions 58 extend from the ends thereof on the pin holes 55 side toward the deep end side thereof in the circumferential direction. With this configuration, the ends of the guide rib portions 58 on the pin holes 55 side are smoothly inserted into the engagement recess portions 48A of the engagement pins 48 inserted into the pin holes 55. Accordingly, the worker easily rotates the purifying cylinder 36 in the mounting rotation direction while the purifying cylinder 36 is positioned coaxially with the upstream cylinder 35 and the downstream cylinder 37, so that the engagement pins 48 are smoothly fitted into the engagement grooves 56 toward the deep ends thereof.

The engagement pins 48 protrude from the connecting surfaces 36E, 36F of the upstream flange portion 36B and the downstream flange portion 36C on the front side of an insertion direction in which the purifying cylinder 36 is inserted between the upstream cylinder 35 and the downstream cylinder 37 when the purifying cylinder 36 is mounted. With this configuration, when the worker mounts the purifying cylinder 36 between the upstream cylinder 35 and the downstream cylinder 37, the worker may inserts the engagement pins 48 into the pin holes 55 facing the respective engagement pins 48, while visually checking them, so that the work of mounting the purifying cylinder 36 is quickened.

By inserting the insertion rib portions 51 to the insertion grooves 59 formed in the flange portions 35C, 37B of the upstream cylinder 35 and the downstream cylinder 37 while the gaskets 53 are inserted into the gasket insertion grooves 52 provided in the proximal end portions of the upstream flange portion 36B and the downstream flange portion 36C of the purifying cylinder 36, the gaskets 53 are disposed between the upstream flange portion 36B and the downstream flange portion 36C of the purifying cylinder 36, and the respective flange portions 35C, 37B of the upstream cylinder 35 and the downstream cylinder 37. Thus, the work of mounting the gasket 53 between the upstream cylinder 35 and the purifying cylinder 36 and the work of mounting the gasket 53 between the downstream cylinder 37 and the purifying cylinder 36 are performed at the same time, so that the workability of mounting the purifying cylinder 36 between the upstream cylinder 35 and the downstream cylinder 37 is further improved.

After removing the clamping members 67, the bolt 46 with which the second support member 45 is fixed is loosened. Subsequently, the purifying cylinder 36 is rotated in the removing rotation direction, and the engagement pins 48 are positioned in the pin holes 55. Then, by moving the downstream cylinder 37 outward in the axial direction (the downstream side) of the exhaust gas purification device 21, the purifying cylinder 36 is removed from the upstream cylinder 35 and the downstream cylinder 37. In addition, after the engagement pins 48 are inserted into the pin holes 55, the purifying cylinder 36 is rotated in the mounting rotation direction. Subsequently, the clamping members 67 are attached to the upstream flange portion 36B and the flange portion 35C, and the downstream flange portion 36C and the flange portion 37B, which face each other.

Furthermore, the bolt 46 is tightened to fix the second support member 45, so that the purifying cylinder 36 is connected between the upstream cylinder 35 and the downstream cylinder 37. Thus, the workability of mounting and removing the purifying cylinder 36 between the upstream cylinder 35 and the downstream cylinder 37 is further improved.

The exhaust gas purification device according to the present invention is not limited to the structure, configuration, appearance, shape, steps, or the like described above in the embodiment, and modifications, improvements, additions, and deletions may be made within the scope of the present invention and without altering the gist of the present invention. It is noted that, in the following description, the same reference numerals as the configuration or the like of the exhaust gas purification device 21 according to the aforesaid embodiment illustrated in the above FIGS. 1 to 14 designate the same or counterpart parts of the configuration or the like of the exhaust gas purification device 21 according to the aforesaid embodiment.

(A) For example, instead of the pin holes 55 of the connecting surfaces 35D, 37D of the flange portions 35C, 37B of the upstream cylinder 35 and the downstream cylinder 37, two engagement pins 48 that extend coaxially with each other outward in the axial direction of the exhaust gas purification device 21 by a predetermined length may be provided to each of the connecting surface 35D and the connecting surface 37D. In addition, instead of the engagement pins 48 in the connecting surface 36E of the upstream flange portion 36B and the connecting surface 36F of the downstream flange portion 36C of the purifying cylinder 36, the pin holes 55 that each have a circular cross section and into which the engagement pins 48 are inserted may be formed on the connecting surface 36E and the connecting surface 36F. The engagement grooves 56 may be formed along the circumferential direction of the flange portions 35C, 37B so as to extend in an opposite direction of the mounting rotation direction of the purifying cylinder 36 (for example, a direction toward a front side of the vehicle in FIG. 2) by a predetermined length continuously from the inner circumferential surfaces of the pin holes 55.

With this configuration, after the worker inserts the gaskets 53 to the gasket insertion grooves 52 of the upstream flange portion 36B and the downstream flange portion 36C of the purifying cylinder 36, the worker holding the handle 36D positions the purifying cylinder 36 between the upstream cylinder and the downstream cylinder 37. Then, the worker may move the purifying cylinder 36 toward the upstream cylinder 35 (in the direction indicated by the arrow 62 in FIG. 9) to insert the engagement pin 48 of the flange portion 35C of the upstream cylinder 35 into the pin hole 55 of the upstream flange portion 36B of the purifying cylinder 36. At the same time, the worker may insert the insertion rib portion 51 of the upstream flange portion 36B, which has a ring-shape in a front view, into the insertion groove 59 of the flange portion 35C of the upstream cylinder 35, so that the connecting surface 36E of the upstream flange portion 36B may be brought into contact with the connecting surface 35D of the flange portion 35C facing the connecting surface 36E.

Subsequently, the worker may move the downstream cylinder 37 toward the purifying cylinder 36 to insert the engagement pin 48 of the flange portion 37B of the downstream cylinder 37 into the pin hole 55 of the downstream flange portion 36C of the purifying cylinder 36. At the same time, the worker may insert the insertion rib portion 51 of the downstream flange portion 36C, which has a ring-shape in a front view, into the insertion groove 59 of the flange portion 37B of the downstream cylinder 37, so that the connecting surface 36F of the downstream flange portion 36C may be brought into contact with the connecting surface 37D of the flange portion 37B facing the connecting surface 36F. In this state, the worker holding the handle 36D may rotate the purifying cylinder 36 in the mounting rotation direction (for example, the rear side of the vehicle), so that the purifying cylinder 36 may be disposed between and coaxially with the upstream cylinder 35 and the downstream cylinder 37, and the alignment in the axial direction of the exhaust gas purification device 21 may be performed.

Thus, the workability of mounting the purifying cylinder 36 between the upstream cylinder 35 and the downstream cylinder 37 is improved with a simple structure. In addition, the purifying cylinder 36 is connected to the upstream cylinder 35 and the downstream cylinder 37 while the connecting surfaces 36E, 36F of the upstream flange portion 36B and the downstream flange portion 36C are in contact with the connecting surfaces 35D, 37D of the flange portions 35C, 37B facing the connecting surfaces 36E, 36F, respectively.

(B) For example, the upstream flange portion 36B of the purifying cylinder 36 and the flange portion 35C of the upstream cylinder 35, and the downstream flange portion 36C of the purifying cylinder 36 and the flange portion 37B of the downstream cylinder 37, facing each other may be connected by using a plurality of bolts and nuts instead of the clamping members 67.

(C) For example, the DPF 26 is used as the purifying processing member to purify the exhaust gas in the present embodiment. However, NOx reduction device may be applied as the exhaust gas purification device. In this case, a selective catalytic reduction catalyst for reducing NOx and a urea water injection valve from which urea water is injected to the selective catalytic reduction catalyst correspond to the purifying processing member.

(D) For, example, the exhaust gas purification device 21 may be generally mounted on not only the forklift 10 but also other industrial vehicles using a diesel engine, such as construction equipment including a dump truck, a hydraulic shovel excavator, a hydraulic crane truck, or the like.

(E) For example, the engagement grooves 56 formed on the connecting surfaces 35D, 37D of the flange portions 35C, 37B of the upstream cylinder 35 and the downstream cylinder 37 may be provided so as to extend toward the front side of the vehicle along the circumferential direction of the flange portions 35C, 37B continuously from the inner circumferential surfaces of the pin holes 55. In other word, the exhaust gas purification device of the present embodiment may be configured in such a manner that the mounting rotation direction of the purifying cylinder 36 is defined as a direction toward a front side of the vehicle.

REFERENCE SIGNS LIST 11 vehicle body
15 engine
21 exhaust gas purification device
22 exhaust pipe
26 Diesel Particulate Filter (DPF)
35 upstream cylinder
35C, 37B flange portion
35D, 36E, 36F, 37D connecting surface
36 purifying cylinder
36B upstream flange portion
36C downstream flange portion
37 downstream cylinder
41, 45 support member
42, 46 bolt
45A long hole
48 engagement pin
48A engagement recess portion
51 insertion rib portion
52 gasket insertion groove
53 gasket
55 pin hole
56 engagement groove
57 pin moving groove
58 guide rib portion
59 insertion groove
67 clamping member

The invention claimed is:

1. An exhaust gas purification device, comprising:
an upstream cylinder provided in an exhaust gas passage of an engine mounted on a vehicle body;
a downstream cylinder disposed on a downstream side of the upstream cylinder; and
a purifying cylinder that is removably serially connected between and coaxially with the upstream cylinder and the downstream cylinder, the purifying cylinder accommodating a purifying processing member that is configured to allow exhaust gas to flow therethrough to purify the exhaust gas, wherein
an end of the upstream cylinder, both ends of the purifying cylinder, and an end of the downstream cylinder each have a flange portion having a flat connecting surface, and the upstream cylinder, the purifying cylinder, and the downstream cylinder are brought into contact with and connected to each other at the connecting surfaces,
each flange portion of one of i) the flange portions of the purifying cylinder, and ii) the flange portions of the upstream cylinder and the downstream cylinder includes an engagement pin protruding in an axial direction by a predetermined height from the connecting surface, each engagement pin having an engagement recess portion that is recessed inward in a radial direction orthogonal to the axial direction by a predetermined depth from an outer circumferential surface across an entire width and extends outward in the axial direction from the corresponding connecting surface by a predetermined width,
each flange portion of the other of i) the flange portions of the purifying cylinder, and ii) the flange portions of the upstream cylinder and the downstream cylinder includes:
a pin hole that is formed at a position of the connecting surface that faces the corresponding engagement pin, and into which the corresponding engagement pin is inserted; and
an engagement groove formed along a circumferential direction of each flange portion, and extending in a mounting rotation direction of the purifying cylinder by a predetermined length continuously from an inner circumferential surface of the corresponding pin hole, wherein the corresponding engagement recess portion is fitted into and engaged with the engagement groove, and
a depth dimension of each engagement groove on a deep end side thereof in the circumferential direction is substantially the same as a length of each corresponding engagement recess portion in the axial direction.

2. The exhaust gas purification device according to claim 1, wherein
the engagement pins each protrude from the connecting surface of the flange portion on a front side of an insertion direction in which the purifying cylinder is inserted between the upstream cylinder and the downstream cylinder when the purifying cylinder is mounted.

3. The exhaust gas purification device according to claim 1, wherein
the upstream cylinder is fixed onto the vehicle body via a first support member,
the downstream cylinder is fixed onto the vehicle body via a second support member with a bolt,
the second support member has a long hole that is long in the axial direction, and through which the bolt is inserted,
the exhaust gas purification device has clamping members that each have a U-shaped or V-shaped groove in a cross sectional view, the grooves are oriented inward to cooperate to form an annular shape, and
the flange portions of the purifying cylinder, and the flange portions of the upstream cylinder and the downstream cylinder, which face each other, are held by the grooves of the respective clamping members to connect with each other removably.

4. The exhaust gas purification device according to claim 1, wherein
the engagement grooves each include:
a pin moving groove formed along the circumferential direction of each flange portion so as to extend in the mounting rotation direction of the purifying cylinder continuously from the inner circumferential surface of the pin hole; and
a guide rib portion protruding inward in the radial direction orthogonal to the axial direction across an entire length in the circumferential direction by a protruding height that is substantially the same as the depth dimension of the engagement recess portion from an edge portion of the inner circumferential surface that is located outward in the radial direction, of the pin moving groove, the edge portion being positioned on the outside of the inner circumferential surface in an axial direction of the pin moving groove, the engagement recess portions are each fitted between the inner circumferential surface of the pin moving groove inward in the radial direction orthogonal to the axial direction and the guide rib portion, and engaged, and a thickness dimension of the guide rib portions on a deep end side thereof in the circumferential direction is substantially the same as the length dimension of the engagement recess portion in the axial direction.

5. The exhaust gas purification device according to claim 4, wherein the guide rib portions each have at an end thereof on the pin hole side a thickness dimension that is smaller than the length dimension of the engagement recess portions in the axial direction, wherein the thickness dimension is increased as the guide rib portion extends from the end thereof on the pin hole side toward the deep end side thereof in the circumferential direction.

6. The exhaust gas purification device according to claim 1, wherein each flange portion of the one of i) the flange portions of the purifying cylinder, and ii) the flange portions of the upstream cylinder and the downstream cylinder includes an insertion rib portion that has a ring shape, and is positioned inward of the engagement pin in the radial direction orthogonal to the axial direction, the insertion rib portion protruding outward in the axial direction by a predetermined height, and extending over the whole circumference in the circumferential direction, and each flange portion of the other of i) the flange portions of the purifying cylinder, and ii) the flange portions of the upstream cylinder and the downstream cylinder includes an insertion groove that has a circular shape in a front view, and is formed over the whole circumference at a position of the flange portion facing the insertion rib portion, wherein the insertion rib portion is inserted into the insertion groove.

7. The exhaust gas purification device according to claim 6, wherein the engagement pins protrude from the connecting surfaces of the flange portions of the purifying cylinder, each of the flange portions of the purifying cylinder has:
a gasket insertion groove that extends over the whole circumference in the circumferential direction of the flange portion along a proximal end portion of the insertion rib portion outward in the radial direction orthogonal to the axial direction, and is concaved inward in the axial direction by a predetermined depth; and a gasket inserted into the gasket insertion groove while the insertion rib portion is inserted through the gasket, and the gaskets are disposed between the flange portions of the purifying cylinder and the corresponding flange portions of the upstream cylinder and the downstream cylinder.

* * * * *